(12) United States Patent
Sachdeva et al.

(10) Patent No.: US 12,179,698 B2
(45) Date of Patent: Dec. 31, 2024

(54) GEAR GUARD CAMERA AND BLUETOOTH SENSOR FUSION TO ENHANCE USER EXPERIENCE

(71) Applicant: Rivian IP Holdings, LLC, Plymouth, MI (US)

(72) Inventors: Sahil Sachdeva, Fremont, CA (US); Sreejith Venugopal Menon, San Jose, CA (US); Geoffrey Francis Burns, Palo Alto, CA (US); Vivek Ravi, San Jose, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 83 days.

(21) Appl. No.: 18/091,523

(22) Filed: Dec. 30, 2022

(65) Prior Publication Data
US 2024/0217482 A1 Jul. 4, 2024

(51) Int. Cl.
*B60R 25/24* (2013.01)
*B60R 25/01* (2013.01)
*G07C 9/00* (2020.01)
*H04B 17/318* (2015.01)

(52) U.S. Cl.
CPC ............ *B60R 25/245* (2013.01); *B60R 25/01* (2013.01); *G07C 9/00309* (2013.01); *H04B 17/318* (2015.01); *G07C 2009/00769* (2013.01); *G07C 2209/63* (2013.01)

(58) Field of Classification Search
CPC ... B60R 25/245; B60R 25/01; G07C 9/00309; G07C 2009/00769; G07C 2209/63; H04B 17/318
See application file for complete search history.

(56) References Cited

U.S. PATENT DOCUMENTS

2023/0019720 A1* 1/2023 Jin ..................... G07C 9/00563

\* cited by examiner

*Primary Examiner* — Vernal U Brown
(74) *Attorney, Agent, or Firm* — HALEY GUILIANO LLP

(57) ABSTRACT

Systems and methods are presented herein for improving the response of a vehicle to at least one person or object approaching a vehicle, and more particularly, to a vehicle that uses at least one of sensor data or Bluetooth sensor data to determine a vehicle state and corresponding vehicle responses to at least one person or object approaching a vehicle. A signal strength is of a wireless signal received from a user device is determined. An object is detected based on a sensor configured to collect data corresponding to an environment external to a vehicle. A vehicle state is determined based on the signal strength and the detected object.

20 Claims, 10 Drawing Sheets

GEAR GUARD CAMERA AND BLUETOOTH SENSOR FUSION TO ENHANCE USER EXPERIENCE

INTRODUCTION

The disclosure is generally directed to improving the response of a vehicle to at least one person or object approaching or leaving a vehicle.

SUMMARY

A vehicle may have a guard mode (e.g., a vehicle mode where a vehicle or items stored in or on the vehicle may be monitored in order to determine whether a responsive or defensive action is to be performed by various vehicle systems, such as locking doors and recording events). The guard mode may lock various doors and containers in response to determining a user has left the internal compartments of the vehicle and has left the area of the vehicle. Additionally, the guard mode may enable or activate cameras and other sensors to characterize an environment surrounding the vehicle to determine if additional locks, notifications, or alarms should be activated to alert the user to an unwelcome vehicle intruder.

The guard mode may have varying levels of activity and processing depending on how far from the vehicle the user is, while also considering whether the user is leaving or approaching the vehicle. A reduction in memory used or processing power required for each iteration of an active guard mode is advantageous in order to allow seamless ingress and egress of the user into and out of the vehicle without the user being overloaded with notifications or alerts for events that do not put the user, the vehicle, or the contents of the vehicle at risk.

Additionally, with lock and unlock functionality, one or more Bluetooth signal receivers may be used and receive wireless signals from a user device. However, because of the different locations of the Bluetooth signal receivers and the relative positions of the user device and obstructions, inconsistent signals may be received which may result in unexpected, invalid, or overall incapable response to a user's proximity to a vehicle (e.g., the doors get locked when the user approaches instead of being unlocked). This may lead to user frustration. Accordingly, improved and consistent vehicle responses to user behavior would be advantageous.

In some example embodiments, the disclosure is directed to at least one of a system configured to perform a method, a non-transitory computer readable medium (e.g., a software or software related application) which causes a system to perform a method, and a method for modifying a vehicle state based on a wireless signal from a user device and object detection data. A signal strength of a wireless signal, received from a user device, is determined. Additionally, an object is detected based on a sensor configured to collect data corresponding to an environment external to a vehicle. A vehicle state is determined based on the signal strength and the detected object. In some embodiments, the wireless signal corresponds to user identification data of a user associated with the user device and the user is external to the vehicle. The sensor is at least one of a camera, a lidar sensor, a radar sensor, a thermal sensor, an ultrasonic sensor, or any sensor suitable for capturing data corresponding to one or more of a user device and an environment surrounding the vehicle. The sensor is arranged to characterize the environment external to the vehicle.

In some embodiments, a current vehicle state has vehicle door lock status that has locked vehicle doors or unlocked vehicle doors. For example, the current vehicle state may be activated based on the activation of the guard mode which monitors an environment around the vehicle and locks the vehicle doors. Additionally, a user state may be determined which indicates that the user is external to the vehicle and is either approaching or departing the vehicle. A comparison between the vehicle state and the user state is performed. In response to determining the current vehicle state is inconsistent with a user state corresponding to a user location relative to the vehicle, modifying the current vehicle state to have a different vehicle door lock status (e.g., if the user is approaching, locked doors are unlocked or if the user is departing, unlocked doors are locked).

In some embodiments, a current vehicle state activates the sensor for collecting and processing data related to the environment surrounding the vehicle. For example, activation of the guard mode may result in power from the vehicle being provided to one or more sensors (e.g., proximity sensors and cameras) which collect data for processing circuitry to identify objects around the vehicle as well as provide input for notifications to be generated by the processing circuitry for transmission to the user device. If the processing circuitry determines that a user is approaching the vehicle (e.g., based on one or more of objection detection as shown in FIG. 9 or RF signal analysis as described in reference to FIG. 7) and there are no other objects in the environment surrounding the vehicle, the vehicle state (e.g., guard mode) is modified such that there is a limitation on the processing of data collected and, by extent, there is a limitation on the generation of notifications for the user. As a result, the guard mode is modified to be in a reduced processing state such that additional power consumption and data processing is prevented. In some embodiments, modifying the current vehicle state comprises at least one of preventing generation of notifications that would otherwise be generated based on data collected from the sensor, preventing processing of data collected from the sensor (e.g., deactivating a guard function that operates on data collected from the sensor), or modifying the current vehicle state comprises focusing processing of data to data corresponding to visual indicators of the object (e.g., the object is the user and modifying the current vehicle state comprises continuing to monitor the user based on data collected by the sensor).

In some embodiments, determining the signal strength of the wireless signal received from the user device comprises determining a first signal parameter of the wireless signal at a first time, determining a second signal parameter of the wireless signal at a second time, and comparing the first signal parameter to the second signal parameter. In response to determining the first signal parameter is different than the second signal parameter based on the comparing, the vehicle state is modified based on a difference between the first signal parameter and the second signal parameter.

The approaches discussed are intended to address the aforementioned deficiencies by means exemplified in the following use cases. A first use case involves a user remaining within a close proximity of the vehicle (e.g., within 10 feet of the vehicle). Around the vehicle, there may be blind spots (e.g., due to obstructions) for cameras and other sensors. There may also be blind spots that result in an attenuation or blocking of radio frequency (hereinafter "RF") signals which may be generated by at least one of a vehicle or a user device of the user which may be paired with the vehicle for user authentication. By using a sensor (e.g., a camera) along with the wireless signal sensor for the RF signals, two sets of data can be analyzed by the system to determine if a user is within a proximity of the vehicle as well as a context of the user's proximity (e.g., the user is approaching, leaving, or remaining around the vehicle, which may reduce the need for data collection and processing by the vehicle).

A second use case involves fluctuations of the RF signals which may result in a false increase of the signal strength (e.g., a user takes a phone out of their pocket while walking away from the vehicle), resulting in an interpretation that a user is approaching the vehicle. As a result, the user may be far away from the vehicle when the vehicle system determines to unlock the car. By combining RF signal data analysis with other sensor data, an improved context of the user location relative to the vehicle can be determined and a vehicle state controller can modify the vehicle state appropriately, according to a more accurate depiction of the user proximity relative to the vehicle.

A third use case involves a guard mode of a vehicle remaining active while a user remains within a small distance of the vehicle (e.g., within 5 feet or 10 feet). For example, a user may park at an event and may wander to neighboring parked cars without losing sight of their own vehicle. The guard mode (e.g., a gear guard mode) may activate cameras and sensors to capture information about the surrounding environment of the vehicle, despite the user being within a reasonable distance of the vehicle. The user may then receive excessive notifications or data about their vehicle, even though the user is able to visibly see and determine whether their vehicle (or the contents of the vehicle) are at risk. The systems and methods of the present disclosure provide a means to avoid excessive processing or collection of data or notifications about the user's vehicle, based on a context of the user's proximity to the vehicle, by use of multiple data and signal checks.

A fourth use case involves a user approaching a vehicle and the vehicle having a guard mode enabled, which records content leading up to the user entering the vehicle. Reliance only on a wireless signal of a device associated with the user's location may result in excessive data collection and data processing up until the user enters the vehicle. The systems and methods of this disclosure combine the wireless signal detection with an analysis of information collected by one or more other sensors to determine if further recording and analysis is needed as the user approaches the vehicle (e.g., the vehicle will unlock without a substantial amount of sensor data review as the user approaches).

For each of the aforementioned use cases, the systems and methods of the disclosure provide two or more inputs which are analyzed to determine how much processing or data collection needs to be provided by a vehicle security system to enable seamless ingress and egress of a user recognized by the vehicle (e.g., determining whether a first sensor, such as a wireless signal receiver, has collected enough data to lock or unlock a vehicle and, in response to determining the first sensor data is insufficient, using data from a second sensor such as a camera to determine whether instructions to lock or unlock the vehicle should be generated). These approaches provide clarity for the vehicle systems regarding a context of a user proximity relative to the vehicle and enable more efficient data processing for a preferred user experience with the vehicle. For example, when determining whether to lock or unlock vehicle doors, both video data and RF signal data may be utilized to confirm whether a user is approaching or departing the vehicle.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for a vehicle that uses at least one of sensor data or wireless signals to determine a vehicle state and corresponding vehicle responses to at least one person or object approaching a vehicle.

The methods and/or any instructions for performing any of the embodiments discussed herein may be encoded on computer-readable medium. Computer-readable medium includes any medium capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, CD, media cards, register memory, processor caches, Random Access Memory (RAM), etc.

Figure 1:
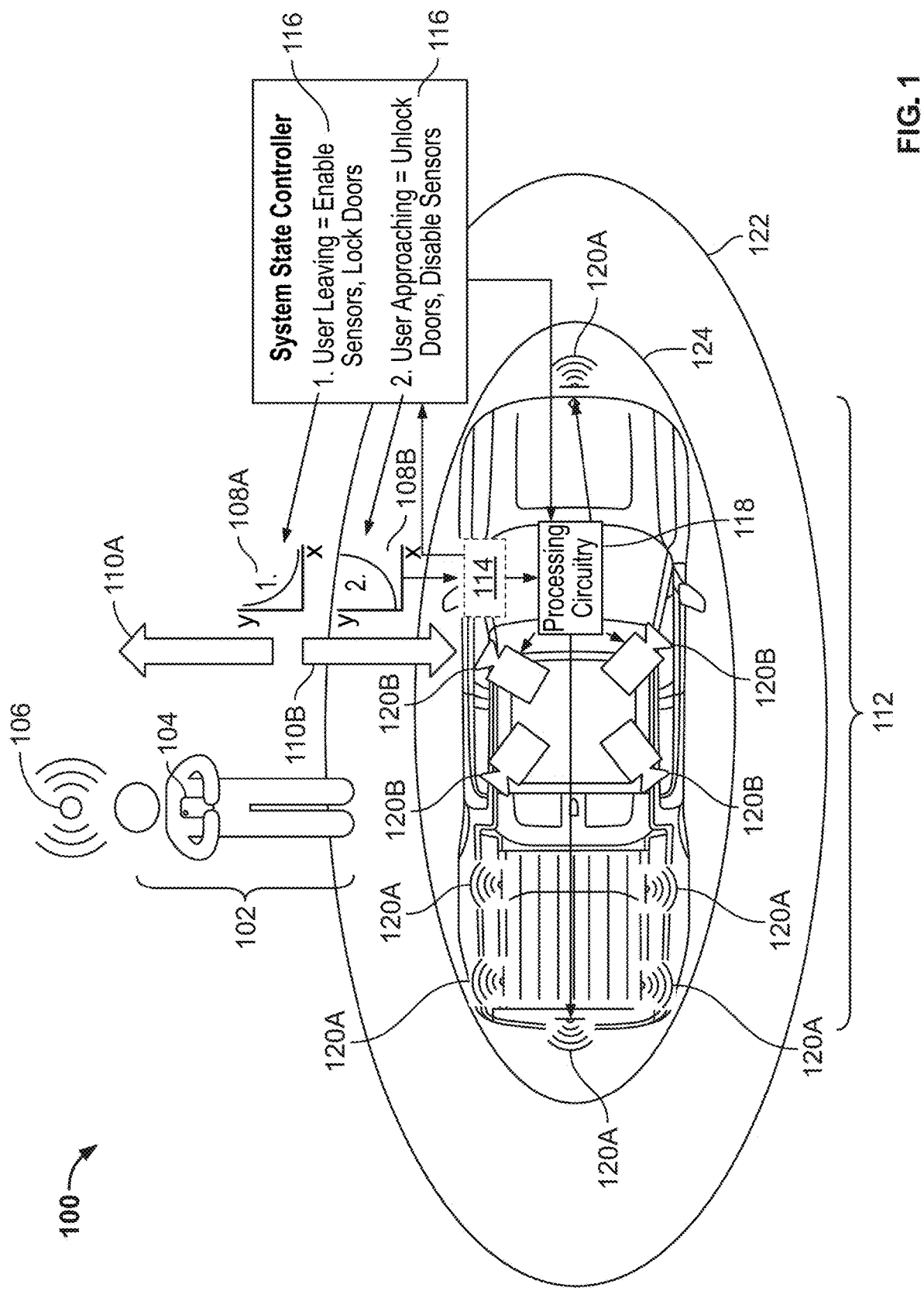
FIG. 1 depicts an exemplary scenario where a signal from a user device and an object detected by a sensor are used to determine a vehicle state, in accordance with some embodiments of the disclosure.

FIG. 1 depicts scenario 100 for determining a vehicle state, in accordance with some embodiments of the disclosure. Scenario 100 comprises elements which may be incorporated, in whole or in part, into each of scenario 200 of FIG. 2, scenario 300 of FIG. 3, and scenario 400 of FIG. 4. Scenario 100 may result in the execution of any or all of method 500 of FIG. 5, method 600 of FIG. 6, and method 700 of FIG. 7, in whole or in part. Scenario 100 may involve the use of any element or all elements in vehicle 800 of FIG. 8. Scenario 100 may also incorporate activation of data processing scenario 900 of FIG. 9 and may also utilize vehicle state management system 1000 of FIG. 10, in whole or in part.

Scenario 100 is comprised of object 102 (e.g., a user), which is coupled to user device 104 (e.g., the user is holding user device 104). User device 104 generates wireless signal 106. Wireless signal 106 may be comprised of an ultra-wideband signal, a Bluetooth signal, a radio frequency (e.g., "RF") signal, or any suitable communication signal configured to transmit data, without a physical communication channel (e.g., a wire), corresponding to one or more of user 102 or user device 104. Additionally, wireless signal 106 may correspond to user identification data of a user associated with user device 104. For example, the user identification data may be used by one or more of processing circuitry 118 and system state controller 116 to determine that object 102 is the user of vehicle 112. One or more of processing circuitry 118 and system state controller 116 may be integrated into or embedded in a central gateway module of the vehicle (e.g., a module configured to transfer or transmit data across one or more vehicle networks to one or more separate modules), a body control module, an electronic control unit communicatively coupled to one or more vehicle networks or modules, or any combination thereof. Wireless signal 106 is characterized by one of signal strengths 108A and 108B, depending on whether object 102 is following departing path 110A or approaching path 110B. For example, signal strength 108A shows a decline in a magnitude associated with wireless signal 106 as object 102 and user device 104 depart from vehicle 112 along departing path 110A. In contrast, signal strength 108B shows an increase in a magnitude associated with wireless signal 106 as object 102 and user device 104 approach vehicle 112 along approaching path 110B.

Signal strengths 108A and 108B may be measured, determined, or characterized by sensor 114 arranged within vehicle 112. Sensor 114 interfaces with at least one of system state controller 116 and processing circuitry 118 by transmitting data related to wireless signal 106. In some embodiments, multiple of sensor 114 are arranged at different locations on, in, or around the vehicle. By comparing signal strengths received via different iterations of sensors 114, the general location of the user can be determined relative to the vehicle. This general location can then be analyzed by object detection sensors to see if there is an object at that location and, more particularly, can be used to determine that the object is the user and the user is one or more of within a particular vehicle proximity, approaching the vehicle, or departing the vehicle.

System state controller 116 determines which system states of vehicle 112, or systems comprising vehicle 112, are active. An exemplary vehicle state management system is depicted in detail in FIG. 10. As shown in scenario 100, a pair of example vehicle system states are related to whether sensors are enabled or disabled and whether the vehicle doors are locked or unlocked. For example, if object 102 is determined to be leaving a proximity of vehicle 112, then system state controller 116 may interface with processing circuitry 118 to transmit instructions throughout various modules controlling devices and systems of vehicle 112 to enable sensors that characterize an environment around vehicle 112 (e.g., to detect and track objects) and also may transmit instructions to lock all vehicle doors since there is no user around vehicle 112. In another example, if object 102 is determined to be approaching a proximity of vehicle 112, then system state controller 116 may interface with processing circuitry 118 to transmit instructions throughout various modules controlling devices and systems of vehicle 112 to disable sensors that characterize an environment around vehicle 112 and also may transmit instructions to unlock all vehicle doors since there is a user approaching vehicle 112.

Object 102 is detected by one or more of sensors 120A and 120B. Sensors 120A may be comprised of a camera, a lidar sensor, a radar sensor, a thermal sensor, an ultrasonic sensor, or any sensor suitable for capturing data (e.g., related to distance or presence of objects relative to one or more of a user or a vehicle), or a combination thereof. Sensors 120A may be used to define vehicle proximity 122 (e.g., up to 20 feet away from vehicle 112). For example, sensors 120A may have a predefined range of detection of objects (e.g., object 102). Depending on what type of object crosses vehicle proximity 122, system state controller 116 may modify the vehicle state such that doors are unlocked, or data collected by sensors 120A and 120B may not be processed or stored. The type of object detected may be determined by object detection process 900 of FIG. 9. If object 102 is determined to be the user of vehicle 112, then one or more of system state controller 116 and processing circuitry 118 may determine to lock or unlock the vehicle depending on whether the user is determined to be approaching or leaving the vehicle. Sensors 120B may comprise a camera, a lidar sensor, a radar sensor, a thermal sensor, an ultrasonic sensor, or any sensor suitable for capturing data (e.g., capable of providing one or more matrices of information to display detected objects and details thereof), or a combination thereof. Sensors 120B provide additional data (e.g., visual data via video frames) for determining the type of object that object 102 is. Additionally, sensors 120B may be utilized to determine whether object 102 is approaching or leaving vehicle 112 based on movements of object 102 between vehicle proximity 122 and vehicle proximity 124 (e.g., up to 5 feet away from vehicle 112). In some embodiments, the relative position of object 102 to vehicle proximity 122 and vehicle proximity 124 may result in activation or deactivation of one or more of sensors 120A, and sensors 120B. For example, if object 102 is determined to be the user of vehicle 112 and is detected within vehicle proximity 122 and is within vehicle proximity 124, both sensors 120A and 120B may be deactivated to avoid additional processing. In another example, if object 102 is determined to not be the user (e.g., a person not affiliated with vehicle 112) and is detected within vehicle proximity 122 and vehicle proximity 124, then both sensors 120A and 120B may remain active with the doors of vehicle 112 remaining locked so as to capture the movements of object 102 and alert a user of the vehicle to the presence of object 102. A third example involves object 102 being determined to be the user of vehicle 112 and the user remains within vehicle proximity 122 without entering vehicle proximity 124. In this example, sensors 120A may remain active while sensors 120B are deactivated since the user can see what is occurring around vehicle 112.

Sensor 114, sensors 120A, and sensors 120B all collect data which are used to determine a vehicle state. Sensor 114 is used to collect data to determine a signal strength of wireless signal 106. The combination of sensors 120A and 120B provide additional data to address inconsistencies with what object 102 is doing relative to vehicle 112 by providing additional characterizations of object 102 which would otherwise be absent or lacking by relying only on data from sensor 114. For example, sensor 114 relies only on data related to wireless signal 106 which may have attenuated data points caused by interference between wireless signal 106 and sensor 114 (e.g., user device 104 is in a pocket of a user corresponding to object 102). If system state controller 116 or processing circuitry 118 only rely on data from sensor 114, then an improper determination of whether object 102 is approaching or leaving one or more of vehicle 112, vehicle proximity 122, and vehicle proximity 124 may be made resulting in the doors of vehicle 112 being unlocked when a user is leaving vehicle 112 and vehicle proximity 122. Since sensors 120A and 120B provide additional data (e.g., inclusive of video footage capturing movements of object 102), system state controller 116 and processing circuitry 118 can utilize the additional data to verify the movements of object 102 and determine whether the vehicle state is compatible with the signal strength of wireless signal 106 and the current position or movements of object 102.

In some embodiments, system state controller 116 and processing circuitry 118 interface to modify a vehicle state based on a determined user state. For example, where object 102 is determined to be the user, a location of object 102 is determined. The location data associated with object 102 (e.g., data indicating whether the user is inside or outside the vehicle, whether the user is within one or more of vehicle proximities 122 and 124), as collected by one or more of sensors 120A, 120B, and 114, is analyzed for determining whether a current vehicle state is consistent with the location of object 102. For example, if signal strength 108A indicates a user is leaving vehicle 112 while sensor data collected by sensors 120A and 120B indicates the user remains within vehicle proximity 124, then processing circuitry 118 interfaces with system state controller 116 to prevent the doors of vehicle 112 from locking until the user actually leaves vehicle proximity 124. The vehicle state is determined based on the signal strength and sensor data related to the detected object such that a vehicle user and vehicle 112 are not subjected to doors being locked or power being drained from one or more of notification generation, data collection, and data processing. In some embodiments, the vehicle state is modified in response to a determination that that current vehicle state is inconsistent with a user state corresponding to the user location relative to the vehicle (e.g., doors that are unlocked may be locked when sensor 114 collects data indicating object 102 is approaching while sensors 120A and 120B collect data indicating object 102 is leaving).

Figure 2:
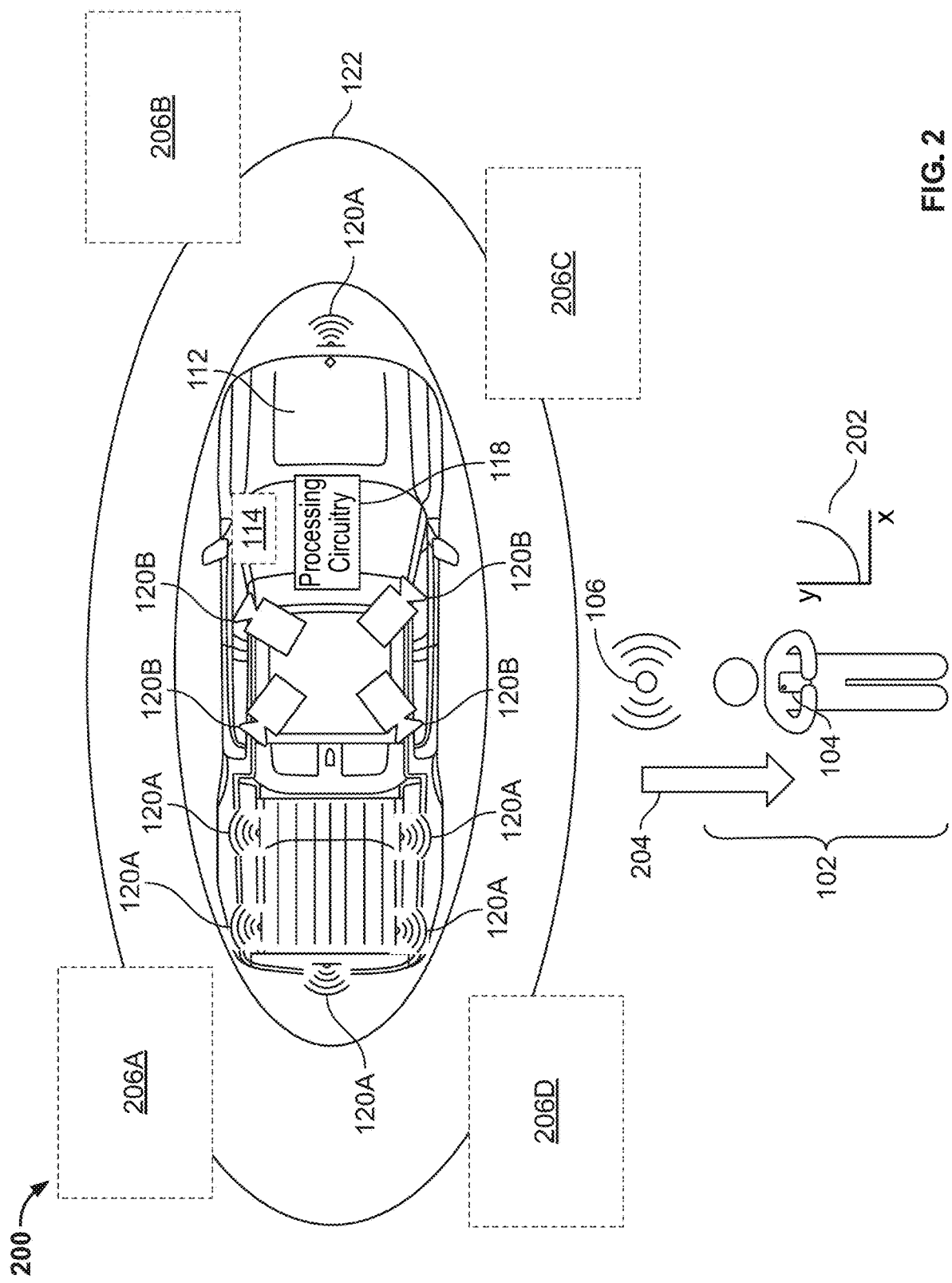
FIG. 2 depicts an exemplary scenario where a signal strength of a signal from a user device and data related to at least one object detected by a sensor are used to determine a vehicle state, in accordance with some embodiments of the disclosure.

FIG. 2 depicts scenario 200 where signal strength 202 of wireless signal 106 from user device 104 and data related to object 102 detected by one or more of sensors 120A and 120B, are used to determine a vehicle state, in accordance with some embodiments of the disclosure. Scenario 200 comprises elements which may be incorporated, in whole or in part, into each of scenario 100 of FIG. 1, scenario 300 of FIG. 3, and scenario 400 of FIG. 4. Scenario 200 may result in the execution of any or all of method 500 of FIG. 5, method 600 of FIG. 6, and method 700 of FIG. 7, in whole or in part. Scenario 200 may involve the use of any element or all elements in vehicle 800 of FIG. 8. Scenario 200 may also incorporate activation of data processing scenario 900 of FIG. 9 and may also utilize vehicle state management system 1000 of FIG. 10, in whole or in part.

Scenario 200 is comprised of object 102 (e.g., a user), which is coupled to user device 104 (e.g., the user is taking user device 104 out of a pocket). Object 102 is following departing path 204 such that wireless signal 106 is attenuated based on interference caused by object 102 before being received by sensor 114 of vehicle 112. For example, user device 104 may be in a pocket, a bag, a container, or enclosure associated with object 102, resulting in an attenuation of wireless signal 106 until user device 104 is removed from the pocket, bag, container, or enclosure. Once user device 104 is removed, wireless signal 106 as received by sensor 114 results in data that may be processed and indicate an incorrect user state (e.g., processing circuitry 118 determines object 102 is approaching vehicle 112 instead of departing vehicle proximity 122). In another example, as a result of the positioning of a body of object 102 between user device 104 and vehicle 112, and by extension sensor 114, signal strength 202 depicts an attenuation of wireless signal 106 such that a reliance only on data corresponding to wireless signal 106 by processing circuitry 118 would yield a false determination that object 102 is approaching vehicle 112. As a result, processing circuitry 118 may transmit instructions to modify a vehicle state to unlock the doors of vehicle despite the presence of non-user objects 206A-206D that are within vehicle proximity 122. By incorporating analysis and processing of data collected by one or more of sensors 120A and 120B, in addition to the processing of data collected by sensor 114, processing circuitry 118 can determine that object 102 has departed vehicle proximity 122 (e.g., sensor 120B may comprise cameras which can record frames depicting that object 102 is beyond the threshold of vehicle proximity 122). The processing of data collected by sensor 114 with the processing of data collected by sensors 120A and 120B prevents a modification of a vehicle state based only on the analysis of one data set by one sensor which may result in an undesired modification of a vehicle state such as unlocking doors when a user is outside vehicle proximity 122 when signal strength 202 falsely correlates to object 102 approaching vehicle 122.

Figure 3:
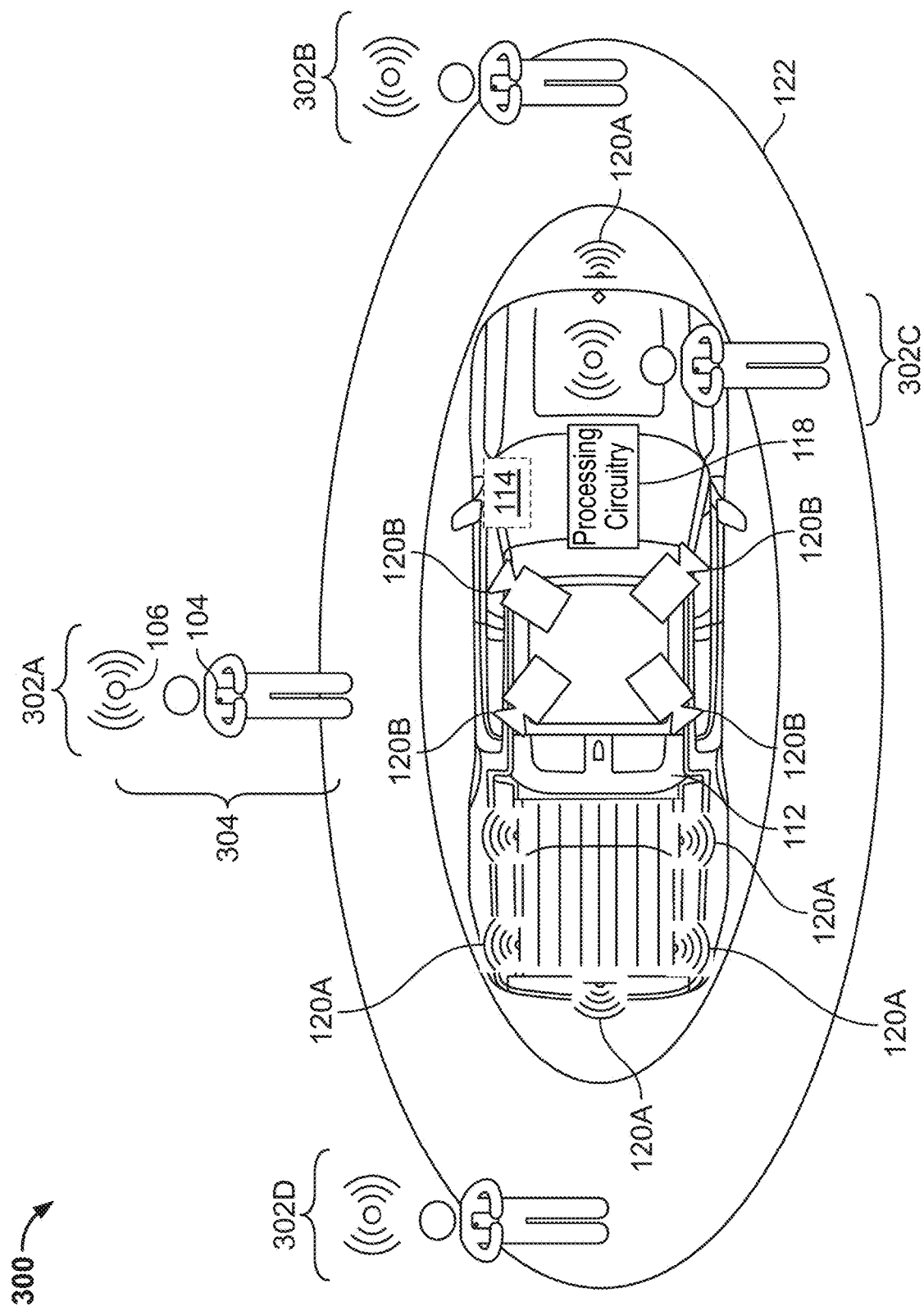
FIG. 3 depicts an exemplary scenario where a signal from a user device and an object detected by a sensor that is determined to be the user of the user device who remains within a proximity of a vehicle are used to determine a vehicle state, in accordance with some embodiments of the disclosure.

FIG. 3 depicts scenario 300 where a user of vehicle 112 remains within close proximity of the vehicle, in accordance with some embodiments of the disclosure. In scenario 300, as the user changes positions (e.g., by moving or walking) around vehicle 112 (e.g., positions 302A-302D), the wireless signal 106 from user device 104 received by one or more sensors 114 may vary in signal strength or stability, making it difficult for vehicle 112 to determine whether the user is approaching or leaving the vehicle. Accordingly, the use of object detection by sensors 120A and 120B can be used to help determine whether the user remains within vehicle proximity 122. By using data from one or both of sensor 114 and sensors 120A and 120B, the location of the user can be more accurately determined, and the location can be used to determine whether a vehicle state of vehicle 112 should be modified (e.g., locked doors should be unlocked or vice-versa).

Figure 4:
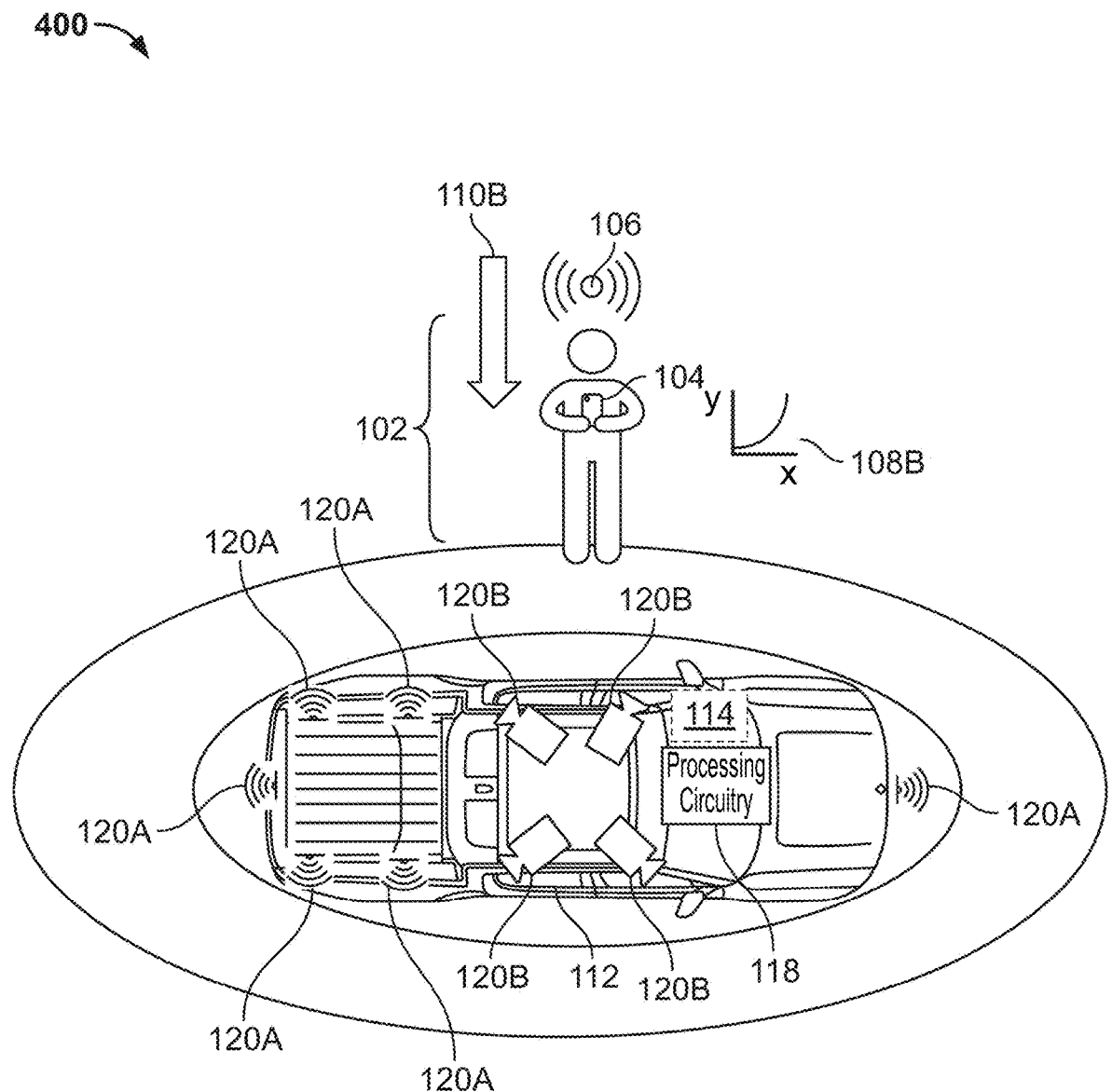
FIG. 4 depicts an exemplary scenario where a signal from a user device and an object detected by a sensor that is determined to be the user of the user device who approaches a vehicle are used to determine a vehicle monitoring state, in accordance with some embodiments of the disclosure.

Scenario 300 comprises elements which may be incorporated, in whole or in part, into each of scenario 100 of FIG. 1, scenario 200 of FIG. 2, and scenario 400 of FIG. 4. Scenario 300 may result in the execution of any or all of method 500 of FIG. 5, method 600 of FIG. 6, and method 700 of FIG. 7, in whole or in part. Scenario 300 may involve the use of any element or all elements in vehicle 800 of FIG. 8. Scenario 300 may also incorporate activation of data processing scenario 900 of FIG. 9 and may also utilize vehicle state management system 1000 of FIG. 10, in whole or in part.

Scenario 300 is comprised of user 304 remaining within vehicle proximity 122 by moving between positions 302A-302D. User 304 corresponds to object 102 of FIG. 1 and object 102 is determined to be a user of vehicle 112 based on data processing of data collected by one or more of sensors 120A, 120B, and 114. Thus, in scenario 300, user 304 is object 102. Considering that user 102 remains within proximity 122, the vehicle state should reflect that the user has easy access to vehicle 112, such as within a garage or at a tailgating event. As a result, notifications generated by processing circuitry 118 and additional data processing of objects that are different from user 304 are not required to determine whether vehicle 112 requires a vehicle state change. As a result, by using one or more of sensors 120A, 120B, and 114, processing circuitry 118 may determine that the vehicle state of vehicle 112 may not require locked doors and the vehicle state should not require a full activation of a guard function (e.g., one or more of a limitation of data collected and data processed is reasonable without risking the integrity of vehicle 112).

By using one or more of sensors 120A, 120B, and 114 to analyze one or more of the position of user 304, user device 104, and wireless signal 106, vehicle 112 may not use as much processing power and user device 104 does not receive excessive notifications that contain information the user 102 can ascertain without the use of the processing of vehicle 112 (e.g., via processing circuitry 118). In some embodiments, one or both of the position of user 304 and the position of user device 104 can be determined based on data collected from one or more of sensors 120A, 120B, and 114. Additionally, wireless signal 106 may comprise characteristics or may comprise data indicative of a position of one or more of object 102 and user device 104.

FIG. 4 depicts scenario 400 where wireless signal 106 (e.g., from user device 104) and object 102 (e.g., as detected by one or more of sensors 120A, 120B, and 114, and determined to be the user of vehicle 112 with user device 104) yield data that, when processed, indicates the user of vehicle 112 is approaching vehicle 112. In response to determining the user of vehicle 112 is approaching vehicle 112, the vehicle state is compared to the user state. For example, the user state may be "user approaching" and the vehicle state may have locked doors. In response to determine the user state is "user approaching," then the vehicle state is modified such that the vehicle doors are unlocked (e.g., a guard mode that locks the vehicle doors is adjusted such that one or more of the doors being unlocked and a reduction of data processing occurs). In some embodiments, scenario 400 results in a modification of a vehicle state of vehicle 112 such that vehicle 112 is in a vehicle monitoring state focused on data related to user 304 and wireless signal 106.

Scenario 400 comprises elements which may be incorporated, in whole or in part, into each of scenario 100 of FIG. 1, scenario 200 of FIG. 2, and scenario 300 of FIG. 3. Scenario 400 may result in the execution of any or all of method 500 of FIG. 5, method 600 of FIG. 6, and method 700 of FIG. 7, in whole or in part. Scenario 400 may involve the use of any element or all elements in vehicle 800 of FIG. 8. Scenario 400 may also incorporate activation of data processing scenario 900 of FIG. 9 and may also utilize vehicle state management system 1000 of FIG. 10, in whole or in part.

Scenario 400 is comprised of object 102 (e.g., a user of vehicle 112) following approaching path 110B towards vehicle 112. Object 102 includes user device 104, which transmits wireless signal 106. Wireless signal 106 has a signal strength which is recorded over time, as depicted by the chart of signal strength 108B. Signal strength 108B corresponds to data collected by sensor 114. Sensors 120A and 120B affirm that signal strength 108B indicates object 102 is approaching vehicle 112. As a result, processing circuitry 118 modifies the vehicle state to unlock the vehicle doors of vehicle 112 and may perform one or more of deactivating a guard mode and reducing data processing related to object 102.

Figure 5:
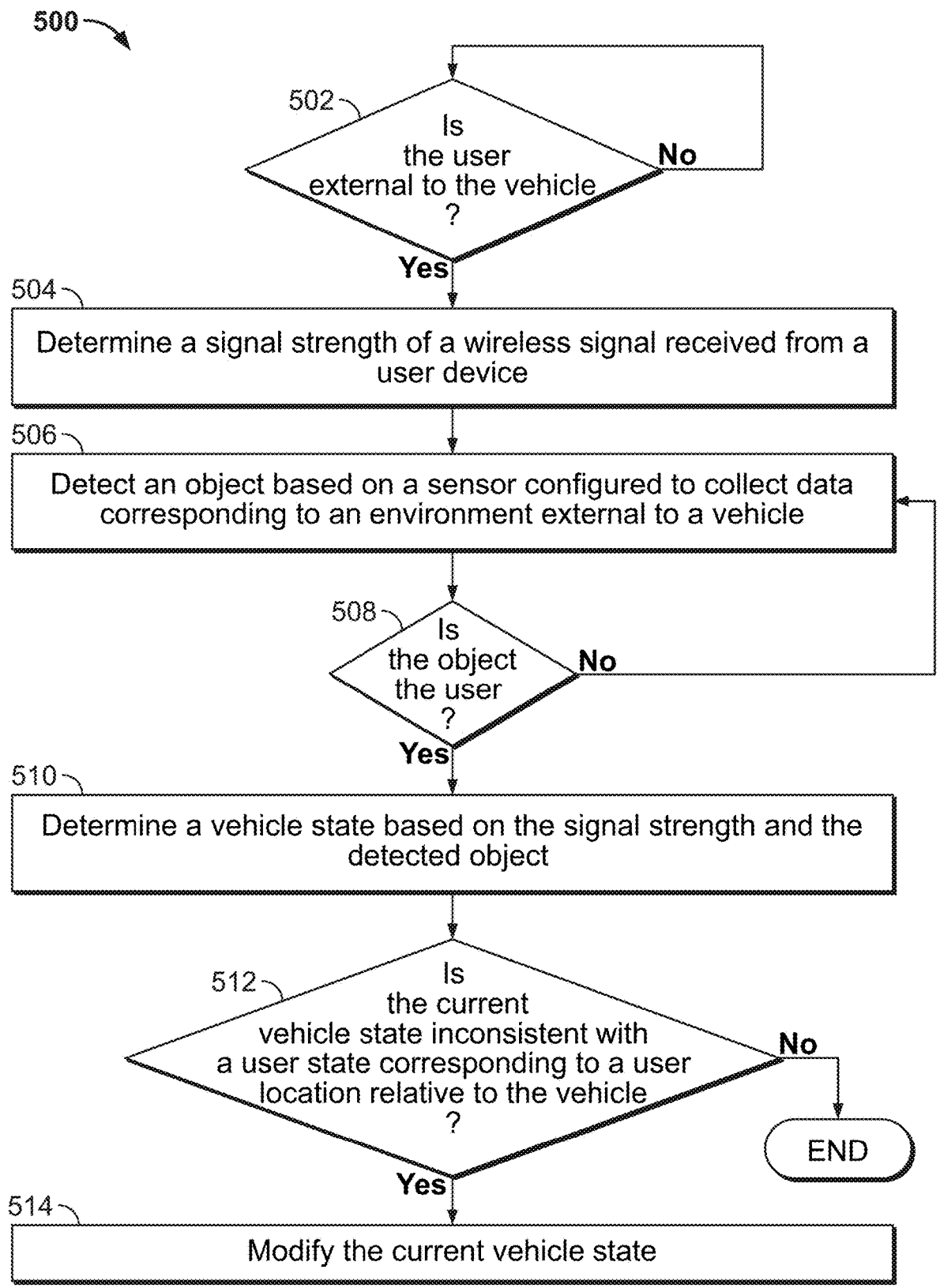
FIG. 5 is a flow chart of an exemplary method for determining a vehicle state based on a signal strength and a detected object, in accordance with some embodiments of the disclosure.

FIG. 5 is a flow chart of method 500 for determining a vehicle state based on a signal strength and a detected object, in accordance with some embodiments of the disclosure. Method 500 may be executed as a result of any or all of scenario 100 of FIG. 1, scenario 200 of FIG. 2, scenario 300 of FIG. 3, and scenario 400 of FIG. 4. Method 500 may be executed with any or all of method 600 of FIG. 6 (e.g., step 512 of FIG. 5 may be executed in response to executing step 602 of FIG. 6) and method 700 of FIG. 7 (e.g., step 508 of FIG. 5 may be incorporated into step 702 of FIG. 7), in whole or in part. Method 500 may be executed using any element or all elements in vehicle 800 of FIG. 8. Method 500 may also be incorporated into the activation of data processing scenario 900 of FIG. 9 and may also utilize vehicle state management system 1000 of FIG. 10, in whole or in part.

At 502, a location of the user relative to the vehicle (e.g., vehicle 112 of FIG. 1) is determined. If the user is determined to be inside the vehicle and not external to the vehicle (NO at 502), the location of the user is continued to be monitored. If the user is determined to be external to the vehicle (YES at 502), a signal strength of a wireless signal (e.g., wireless signal 106 of FIG. 1) received from a user device (e.g., user device 104 of FIG. 1) is determined at 504. At 506, an object is detected based on a sensor (e.g., one or more of sensors 120A and 120B of FIG. 1) configured to collected data corresponding to an environment external to a vehicle. The object may be characterized, for example, via data processing scenario 900 of FIG. 9 which relies on data collected by one or more of sensors 120A, 120B, and 114. If the object is not determined to the be the user (NO at 508), then an object is detected based on a sensor at 506. If the object is determined to be the user (YES at 508), then a vehicle state is determined at 510, based on the signal strength and the detected object. Example vehicle states are shown in FIG. 10, where a vehicle power state and a vehicle security state are modified based on varying inputs received by the vehicle and various messages transmitted between one or more of modules or processing units within the vehicle. In some embodiments, the vehicle state results in a vehicle door lock status that has locked vehicle doors or unlocked vehicle doors.

At 512, the current vehicle state is compared to a user state. The user state corresponds to a user location and/or movement relative to the vehicle. For example, the user state may be determined to be "user approaching vehicle" or "user departing vehicle." If the current vehicle state is consistent with a user state corresponding to a user location relative to the vehicle (NO at 512), then the process ends as the vehicle state does not need to be modified. For example, when the current vehicle state corresponds to locked vehicle doors and the user state is determined to be outside a detectable vehicle proximity (e.g., vehicle proximity 122 of FIG. 1), then the current vehicle state is not modified. If the current vehicle state is inconsistent with a user state corresponding to a user location relative to the vehicle (YES at 512), then the current vehicle state is modified at 514. For example, if the user is determined to be within a detectable vehicle proximity (e.g., within vehicle proximity 124 of FIG. 1), the user is approaching the vehicle, and the current vehicle state corresponds to locked vehicle doors, then the vehicle state is modified to unlock the doors (e.g., as shown in FIG. 6).

Figure 6:
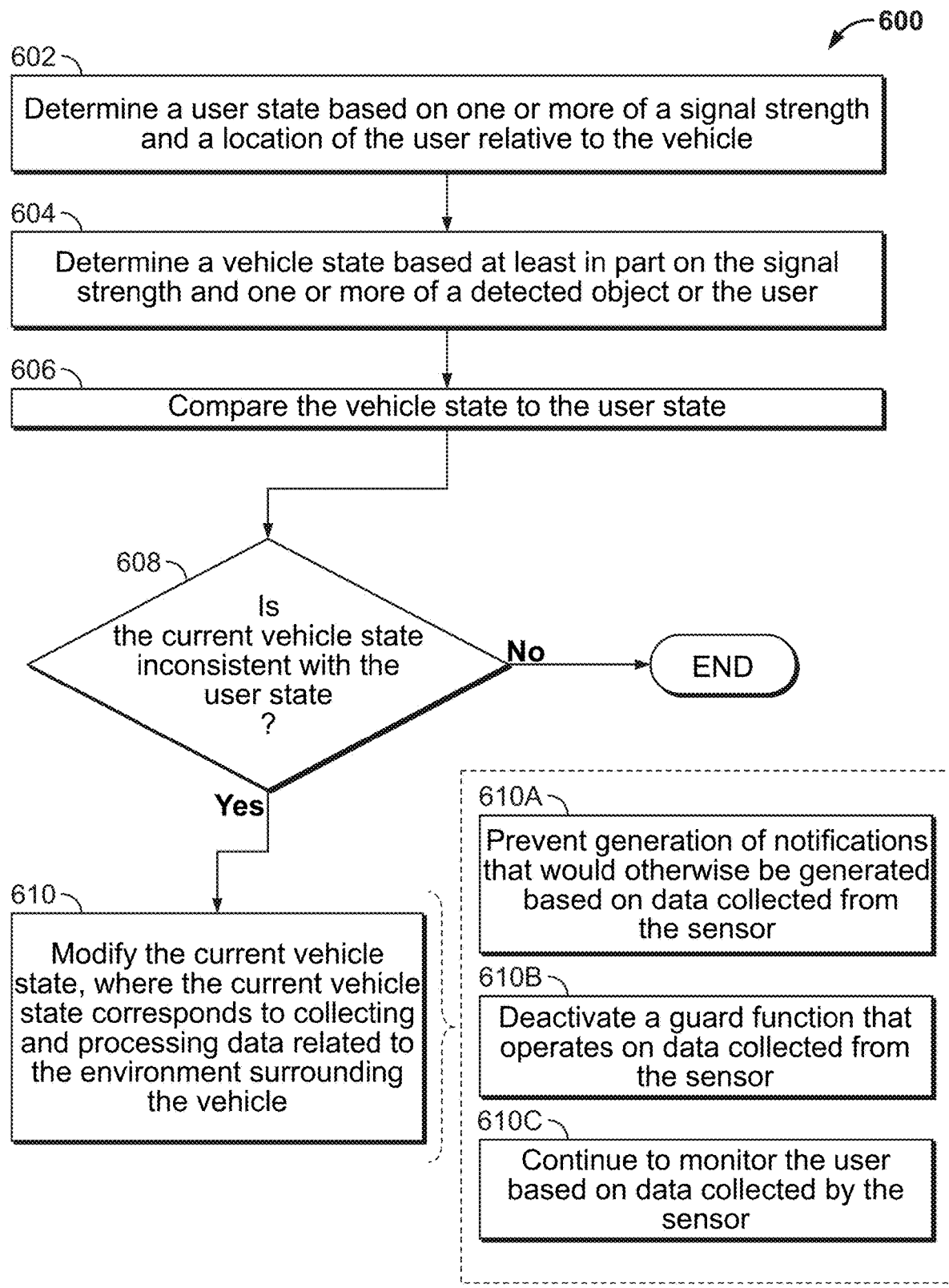
FIG. 6 is a flow chart of an exemplary method for modifying a vehicle state, in accordance with some embodiments of the disclosure.

FIG. 6 is a flow chart of method 600 for modifying a vehicle state, in accordance with some embodiments of the disclosure. Method 600 may be executed as a result of any or all of scenario 100 of FIG. 1, scenario 200 of FIG. 2, scenario 300 of FIG. 3, and scenario 400 of FIG. 4. Method 600 may be executed with any or all of method 500 of FIG. 5 and method 700 of FIG. 7 (e.g., step 602 of FIG. 6 may be incorporated into step 702 of FIG. 7), in whole or in part. Method 600 may be executed using any element or all elements in vehicle 800 of FIG. 8. Method 600 may also be incorporated into the activation of data processing scenario 900 of FIG. 9 and may also utilize vehicle state management system 1000 of FIG. 10, in whole or in part.

Method 600 starts with processing data from one or more sensors (e.g., one or more of sensors 114, 120A, and 120B) to identify an object within a proximity (e.g., within 5 feet or 20 feet) of a vehicle as a user of the vehicle. In some embodiments, the object is determined to be the user. At 602, a user state is determined based on one or more of a signal strength (e.g., a signal strength of wireless signal 106 of FIG. 1) and a location of the user relative to the vehicle (e.g., based on sensor data processed by processing circuitry 118 of FIG. 1, as collected by one or more of sensors 120A, 120B, and 114). At 604, a vehicle state is determined based at least in part on the signal strength and one or more of a detected object or the user. Example vehicle states are depicted in FIG. 10, depending on a vehicle power state and messages transmitted relative to a vehicle security state (e.g., a guard mode). At 606, the vehicle state is compared to the user state (e.g., using processing circuitry 118 of FIG. 1). If the current vehicle state is consistent with a user state corresponding to a user location relative to the vehicle (NO at 608), then the method ends as the vehicle state complies with the user state and user location (e.g., the user is outside a detectable vehicle proximity and the vehicle doors are locked). If the current vehicle state is inconsistent with a user state corresponding to a user location relative to the vehicle (YES at 608), then the current vehicle state is modified at 610. Modifying the current vehicle state at 610 results in the occurrence of any or all of 610A, 610B, and 610C.

610A corresponds to modifying the current vehicle state by preventing generation of notifications that would otherwise be generated based on data collected from the sensor. For example, the vehicle state may result in sensors 120A and 120B of FIG. 1 remaining active such that data collected is processed by processing circuitry 118 of FIG. 1. Processing circuitry 118 may be configured to transmit notifications related to vehicle proximity alerts regarding objects approaching vehicle 112 of FIG. 1 to user device 104. If it is determined that the user is within vehicle proximity 124, the generation and transmission of notifications related to objects approaching the vehicle may be considered superfluous, considering the user's ability to see the environment surrounding the vehicle, and thus are prevented.

610B corresponds to deactivating a guard function that operates on data collected from the sensor (e.g., one or more of sensors 120A and 120B). For example, a current vehicle state may activate any or all of sensors 120A and 120B of FIG. 1 for collecting data corresponding to the environment surrounding the vehicle. If the user is determined to be within vehicle proximity 124 of FIG. 1, then the use of any or all of sensors 120A and 120B is not required for a user to comprehend the environment surrounding vehicle 112 of FIG. 1. Therefore, modifying the current vehicle state at 610B deactivates sensors 120A and 120B for the duration that the user remains within vehicle proximity 124 of FIG. 1 to prevent power consumption by vehicle 112, to maintain operation of guard related functions, and to prevent processing of data by vehicle 112, which may result in notifications on user device 104 of FIG. 1 that a user does not require.

610C corresponds to modifying the current vehicle state such that the user is continued to be monitored based on data collected by the sensor. For example, the object is determined to the user (e.g., via data processing scenario 900 of FIG. 9) and the user proximity to vehicle 112 of FIG. 1 allows the various sensors of vehicle 112 (e.g., one or more of sensors 120A, 120B, and 114) to continue to collect data related to the user. As with 610B, the modification of the vehicle state at 610C is configured to prevent power consumption by vehicle 112 to maintain operation of guard related functions and to prevent processing of data by vehicle 112, which may result in notifications on user device 104 of FIG. 1 that a user does not require. As a result, the modification of the vehicle state at 610C limits data processing of data collected by sensors of vehicle 112 to data related to the user such that the vehicle state remains consistent with the user's proximity to the vehicle. In some embodiments, one or more of 610A-610C may be performed as part of a vehicle state modification. Different scenarios (e.g., as shown in FIGS. 1-4) may result in one or more of the modifications described in reference to 610A-610C being performed.

Figure 7:
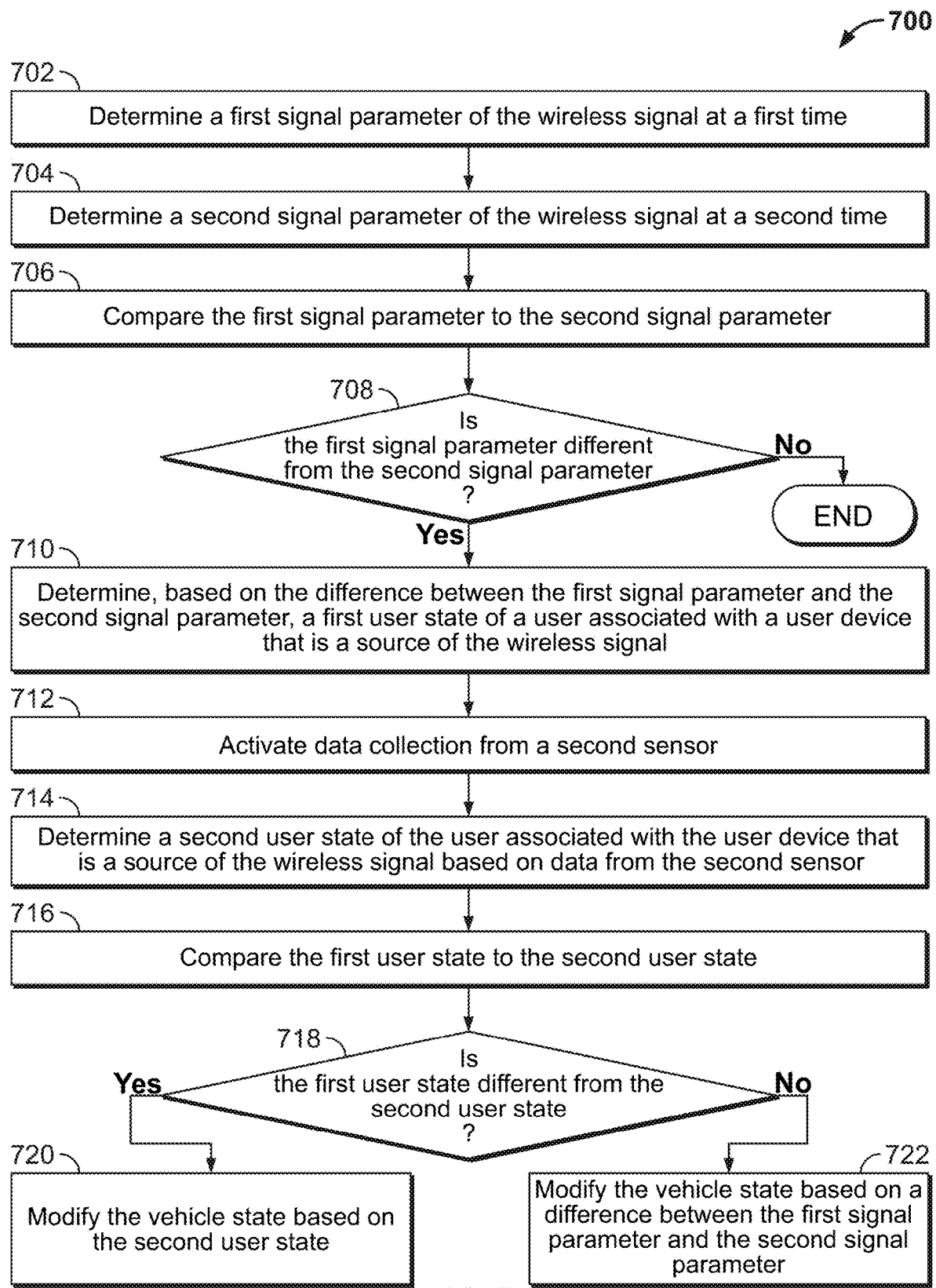
FIG. 7 is a flow chart of an exemplary method for modifying a vehicle state based on a comparison of signal parameters, in accordance with some embodiments of the disclosure.

FIG. 7 is a flow chart method 700 for modifying a vehicle state based on a comparison of signal parameters, in accordance with some embodiments of the disclosure. Method 700 may be executed as a result of any or all of scenario 100 of FIG. 1, scenario 200 of FIG. 2, scenario 300 of FIG. 3, and scenario 400 of FIG. 4. Method 700 may be executed with any or all of method 500 of FIG. 5 and method 600 of FIG. 6, in whole or in part. Method 700 may be executed using any element or all elements in vehicle 800 of FIG. 8. Method 700 may also be incorporated into the activation of data processing scenario 900 of FIG. 9 and may also utilize vehicle state management system 1000 of FIG. 10, in whole or in part.

At 702, a first signal parameter of the wireless signal (e.g., wireless signal 106 of FIG. 1) is determined at a first time. For example, the first signal parameter may be a magnitude of the signal, a wavelength of the signal, or any signal parameter detectable via sensor 114 of FIG. 1 that can be used to determine whether user device 104 of FIG. 1 is approaching or leaving one or more of vehicle 112, vehicle proximity 124, and vehicle proximity 122. At 704, a second signal parameter of the wireless signal is determined at a second time. The second signal parameter may be the same parameter type as the first signal parameter, or may be related to the first signal parameter in a manner that enables processing circuitry 118 of FIG. 1 to determine whether user device 104 of FIG. 1 is approaching or leaving one or more of vehicle 112, vehicle proximity 124, and vehicle proximity 122. At 706, the first signal parameter is compared to the second signal parameter. If the first signal parameter is determined to not be different (e.g., equal to or similar, such as within a predefined bandwidth of values such as less than a 25% difference in values associated with each parameter) than the second signal parameter (NO at 708), then the method ends as the vehicle state is not required to be modified. If the first signal parameter is determined to be different (e.g., outside a predefined bandwidth of values such as more than a 25% difference in values associated with each parameter) than the second signal parameter (YES at 708), then a first user state of a user associated with a user device that is a source of the wireless signal is determined at 710, based on the difference between the first signal parameter and the second signal parameter.

For example, if the difference is a negative value, then processing circuitry (e.g., processing circuitry 118 of FIG. 1) may determine the first signal parameter is smaller than the second signal parameter and indicates the object (e.g., the user) is approaching the proximity of the vehicle. In another example, if the difference is positive, then processing circuitry may determine the object is departing the vehicle. As shown in FIG. 1, signal strengths 108A and 108B are depicted as a pair of charts with signal parameter data over time. Signal strength 108A depicts that over time the magnitude of the signal strength declines while signal strength 108B depicts that over time the magnitude of the signal increases. Each chart corresponds to data processing via method 700 that would result in different vehicle state modifications, as depicted in system state controller 116 of FIG. 1.

In some embodiments, the difference in signal strengths may be compared to one or more thresholds. For example, if the difference in signal strengths is less than a lower threshold then a preliminary determination that a user is departing the vehicle may be generated, causing additional sensor data to be reviewed to confirm that the user is departing (e.g., via proximity sensor data analysis or video frame analysis). In another example, if the difference in signal strengths is greater than a higher threshold that is larger in magnitude than the lower threshold, then a preliminary determination that the user is approaching the vehicle may be generated, causing additional sensor data to be reviewed to confirm that the user is approaching.

At 712, data collection from a second sensor is activated. For example, one or more of sensors 120A and 120B of FIG. 1 may be activated to collect additional data (e.g., a camera turns on). At 714, a second user state of the user associated with the user device that is a source of the wireless signal based on data from the second sensor is determined. For example, frames of video may be analyzed to identify the user and determine if the user is approaching or departing the vehicle. At 716, the first user state is compared to the second user state. If the first user state is different from the second user state (YES at 718) then the vehicle state is modified at 720 based on the second user state. For example, the first user state may be determined based on signal noise or RF signal attenuation causing a false or improper determination of whether a user is approaching or departing. Analyzing data from one or more alternative sensors (e.g., proximity sensors or cameras) provides the system with a redundant check to verify the accuracy of an initial user state determination. If the first user state is not different from the second user state (NO at 18), then the vehicle state is modified at 722 based on a difference between the first signal parameter and the second signal parameter. As a continuation of the signal strength example provided earlier, where the difference is negative, the user may be determined to be approaching the vehicle and locked vehicle doors are unlocked. Alternatively, where the difference is negative, the user may be determined to be departing the vehicle and unlocked doors are locked.

Figure 8:
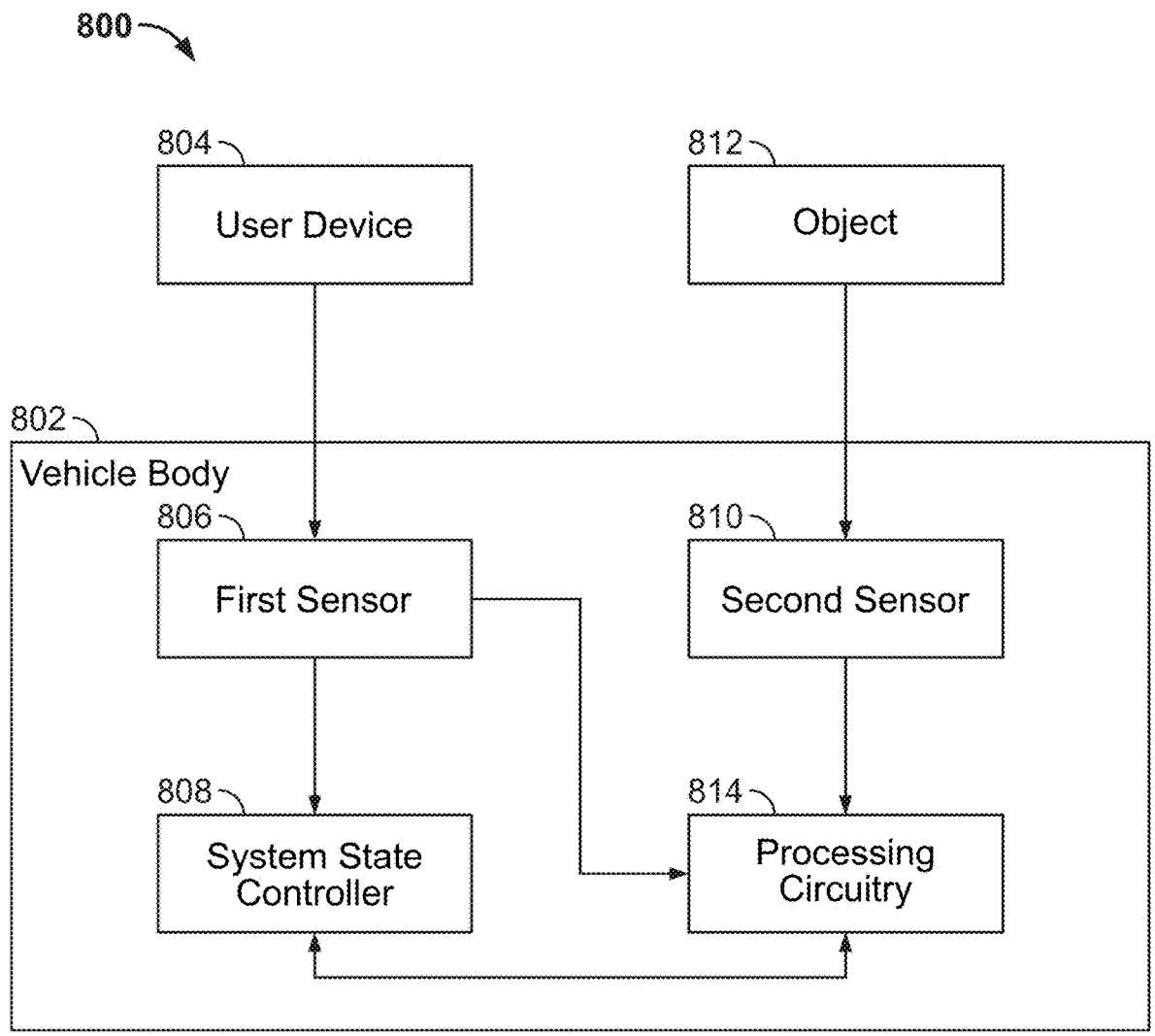
FIG. 8 is a block diagram of an exemplary system, in accordance with some embodiments of the disclosure.

FIG. 8 depicts system 800, in accordance with some embodiments of the disclosure. System 800 comprises elements which may be incorporated, in whole or in part, into vehicle 112 of each of scenario 100 of FIG. 1, scenario 200 of FIG. 2, scenario 300 of FIG. 3, and scenario 400 of FIG. 4. System 800 may be configured to execute any or all of method 500 of FIG. 5, method 600 of FIG. 6, and method 700 of FIG. 7, in whole or in part. System 800 may also being incorporated into data processing scenario 900 of FIG. 9 and may also utilize vehicle state management system 1000 of FIG. 10, in whole or in part.

System 800 is comprised of vehicle body 802 and user device 804. User device 804 corresponds to user device 104 of FIG. 1 and is configured to transmit a wireless signal (e.g., wireless signal 106 of FIG. 1) for data collection by first sensor 806. First sensor 806 corresponds to sensor 114 of FIG. 1. First sensor 806 is configured to transmit data to system state controller 808 (e.g., system state controller 116 of FIG. 1) and processing circuitry 814 (e.g., processing circuitry 118 of FIG. 1). System state controller 808 and processing circuitry 814 are also communicably coupled to each other in order to regulate vehicle state changes associated with vehicle body 802 and systems therein (e.g., locking or unlocking vehicle doors, and activating or deactivating guard functions which monitor environments surrounding vehicle body 802). Second sensor 810 corresponds to one or more of sensors 120A and 120B of FIG. 1. Second sensor 810 collects data related to object 812 and is communicably coupled to processing circuitry 814. Processing circuitry 814 uses data from first sensor 806 and second sensor 810 to determine whether system state controller 808 should transmit instructions to modify a vehicle state of vehicle body 802 (e.g., modify a door lock status or guard function activation status).

Figure 9:
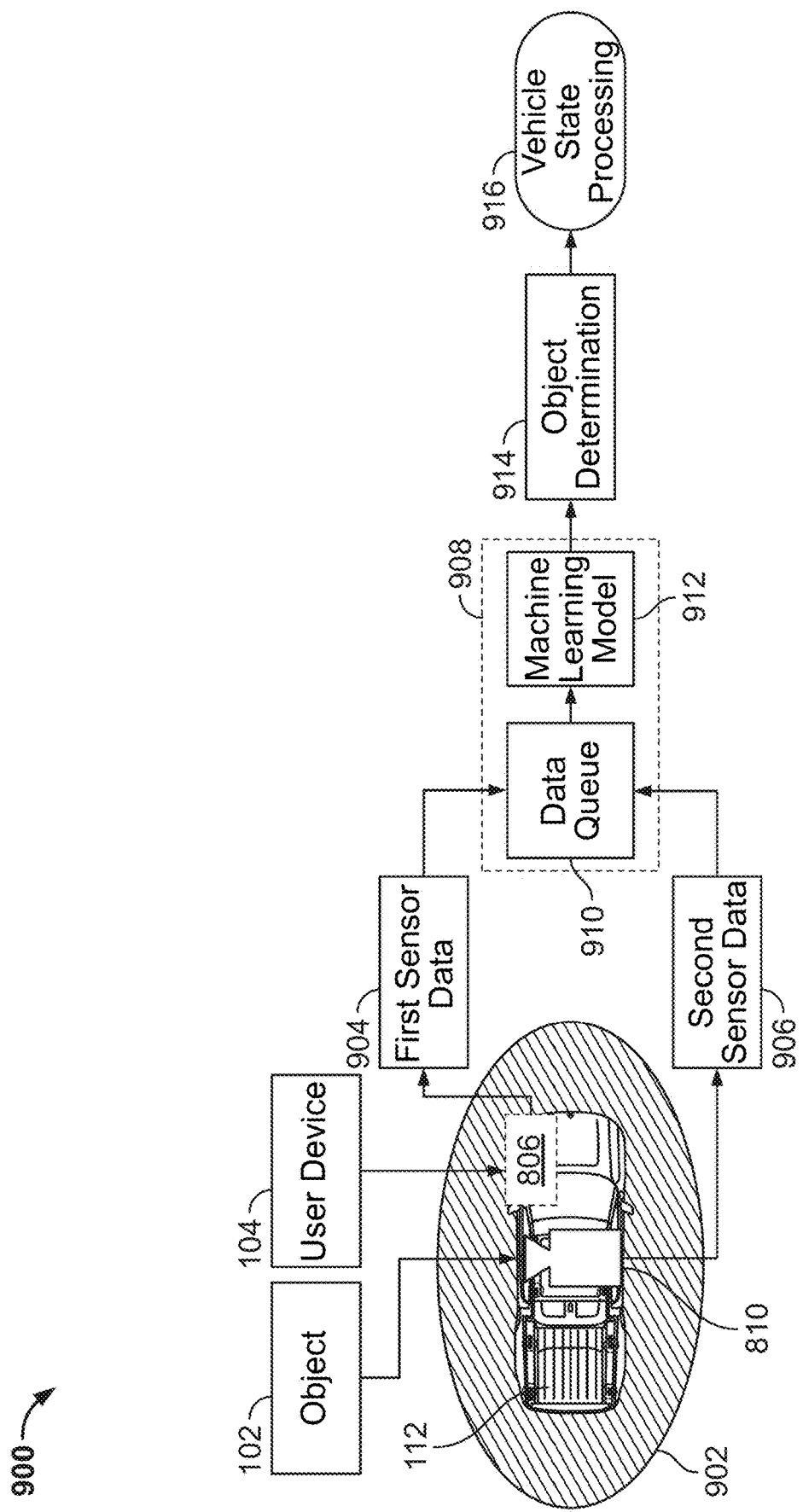
FIG. 9 is a flow chart of data collection (e.g., by a pair of sensors) and processing thereof for processing a vehicle state, in accordance with some embodiments of the disclosure.
Figure 10:
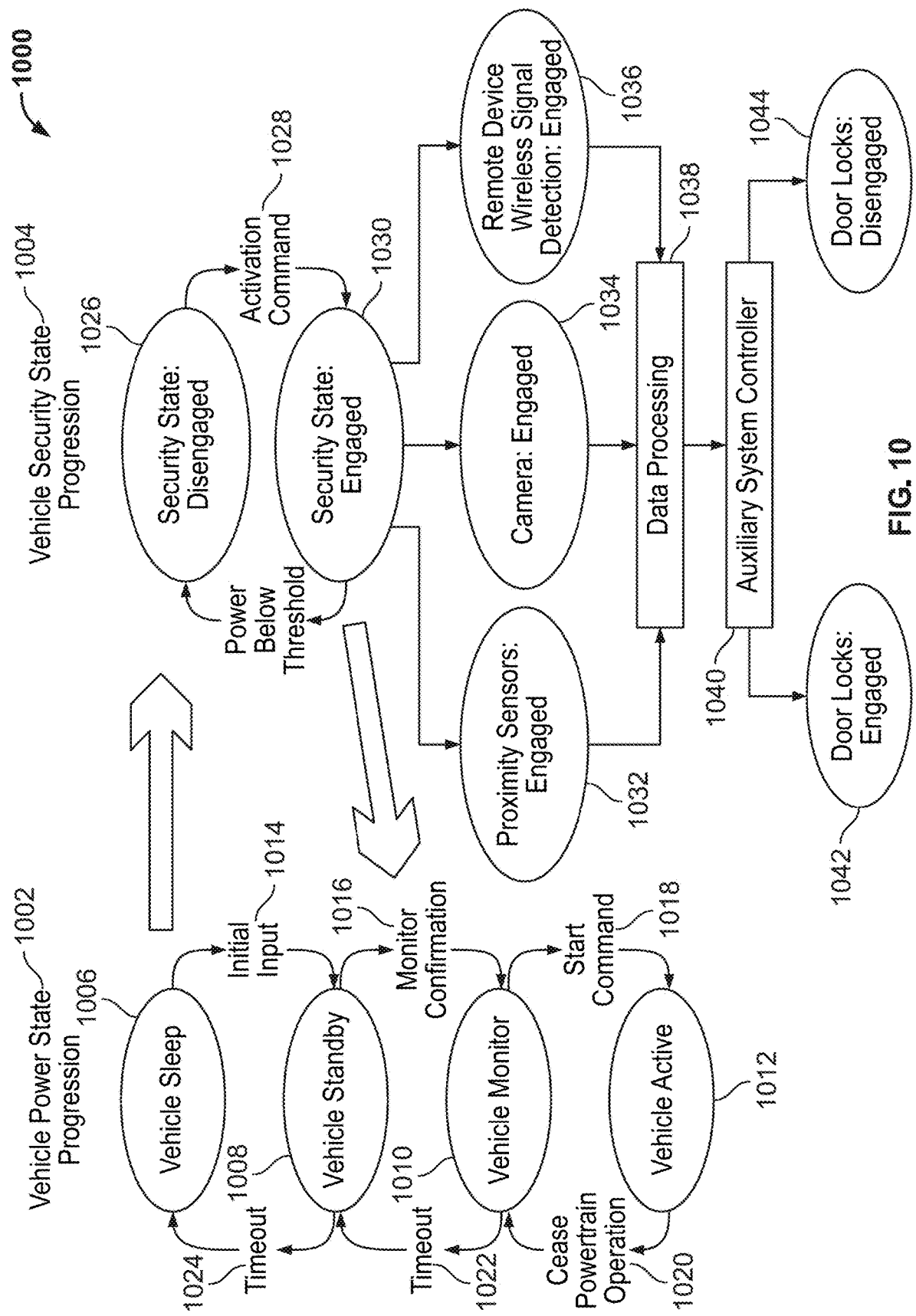
FIG. 10 is a flow chart of an exemplary vehicle state management system, in accordance with some embodiments of the disclosure.

FIG. 9 depicts data processing scenario 900, in accordance with some embodiments of the disclosure. Data processing scenario 900 comprises elements which may be incorporated, in whole or in part, into each of scenario 100 of FIG. 1, scenario 200 of FIG. 2, scenario 300 of FIG. 3, and scenario 400 of FIG. 4. Data processing scenario 900 may result in the execution of any or all of method 500 of FIG. 5, method 600 of FIG. 6, and method 700 of FIG. 7, in whole or in part. Data processing scenario 900 may involve the use of any element or all elements in vehicle 800 of FIG. 8. Data processing scenario 900 may also utilize vehicle state management system 1000 of FIG. 10, in whole or in part.

Data processing scenario 900 is comprised of object 102 being detected by second sensor 810 (e.g., one or more of sensors 120A and 120B of FIG. 1) and user device 104 transmitting a wireless signal (e.g., wireless signal 106 of FIG. 1) to first sensor 806 (e.g., sensor 114 of FIG. 1). First sensor 806 and second sensor 810 are arranged within vehicle 112. Vehicle 112 is within environment 902, which extends at least as far as vehicle proximity 122 of FIG. 1. First sensor 806 collects first sensor data 904 and second sensor collects second sensor data 906. Each of first sensor data 904 and second sensor data 906 are transmitted to processing circuitry 908 (e.g., processing circuitry 118 of FIG. 1) and stored in data queue 910. Data queue 910 transmits first sensor data 904 and second sensor data 806 to machine learning model 912. Machine learning model 912 includes a library of known objects as characterized by previously collected data and includes a capability to identify new objects where one or more of first sensor data 904 and second sensor data 906 do not corroborate to previously identified objects. Based on the processing accomplished via machine learning model 912, processing circuitry 908 outputs object determination 914 (e.g., identifies object 102 as the user of vehicle 112), which is then used to perform vehicle state processing 916. Vehicle state processing 916 corresponds to the modification of vehicle states as described in relation to scenarios 100-400 of FIGS. 1-4. In some embodiments, vehicle state processing 916 is executed via vehicle state management systems 1000 of FIG. 10.

FIG. 10 depicts vehicle state management system 1000, in accordance with some embodiments of the disclosure. Vehicle state management system 1000 comprises elements which may be incorporated, in whole or in part, into each of scenario 100 of FIG. 1, scenario 200 of FIG. 2, scenario 300 of FIG. 3, and scenario 400 of FIG. 4. Vehicle state management system 1000 may result in the execution of any or all of method 500 of FIG. 5, method 600 of FIG. 6, and method 700 of FIG. 7, in whole or in part. Vehicle state management system 1000 may involve the use of any element or all elements in vehicle 800 of FIG. 8. Vehicle state management system 1000 may also incorporate activation of data processing scenario 900 of FIG. 9, in whole or in part.

Vehicle state management system 1000 comprises vehicle power state progression 1002 and vehicle security state progression 1004. Vehicle power state progression 1002 provides an example of how vehicle 112 of FIG. 1 may change between power states in order to engage or disengage a vehicle security state (e.g., a vehicle state enabling activation of a series of guard functions as described in reference to FIG. 1). Vehicle power state progression 1002 is comprised of vehicle sleep power state 1006, vehicle standby power state 1008, vehicle monitor power state 1010, and vehicle active power state 1012. Vehicle sleep power state 1006 deactivates or disengages a vehicle security state as there is no power available from the vehicle to enable the vehicle security state. When initial input 1014 is received (e.g., sensor 114 of FIG. 1 detects user device 104 or a key FOB is detected), vehicle sleep power state 1006 is modified to vehicle standby power state 1008, where the vehicle is now capable of activating systems within the vehicle in response to certain inputs (e.g., object 102 of FIG. 1 is detected by one or more of sensors 120A, 120B, and 114). When monitor confirmation 1016 is received (e.g., via system state controller 116 of FIG. 1 in response to determining one or more of sensors 120A, 120B, and 114 are active and collecting data), vehicle standby power state 1008 is modified to vehicle monitor power state 1010, which enables vehicle security state related systems of the vehicle to receive power, collect data, and transmit information between vehicle modules. When start command 1018 is received, vehicle standby power state 1008 is modified to vehicle active power state 1012 such that systems including a vehicle powertrain are active. The vehicle security state may be modified, activated, or deactivated, depending on the use of the vehicle when in vehicle active power state 1012 (e.g., some or all of guard functions may remain active when the powertrain is active such that a user is alerted to objects in the environment surrounding the vehicle).

Vehicle power state progression 1002 includes a series of power state modification protocols to reduce the power required by the vehicle to operate in each state. For example, vehicle active power state 1012 is modified back to vehicle monitor power state 1010 in response to receiving cease powertrain operation instruction 1020 (e.g., a button is pressed, or knob is turned to deactivate the vehicle powertrain). Vehicle monitor power state 1010 may be modified back to vehicle standby power state 1008 in response to timeout 1022 being achieved (e.g., a predetermined amount of time has passed without receiving data or an instruction) due to a lack of reception of monitor confirmation 1016 (e.g., the vehicle security state is not activated and one or more of sensors 120A, 120B and 114 do not collect data). In response to timeout 1022 being achieved and the vehicle power state being modified back to vehicle standby power state 1008, the vehicle monitors signals for initial input 1014. Vehicle standby power state 1008 may be modified back to vehicle sleep power state 1006 in response to timeout 1024 being achieved (e.g., a predetermined amount of time has passed without receiving data or an instruction) due to a lack of reception of initial input 1014 (e.g., none of a user, a user device, or vehicle key fob are detected).

Vehicle security state progression 1004 is configured to be modified based at least in part on the modification of vehicle power states according to vehicle power state progression 1002 such that the systems active during the progression of vehicle states aligned with vehicle security state progression 1004 receive enough power to provide a vehicle user with appropriate information and function. Additionally, vehicle security state progression 1004 may be modified based on a determination that a user is departing or approaching the vehicle. For example, signal strength analysis may trigger an initial power up of secondary sensors, which then receive power and provide data for processing to confirm a user state (e.g., approaching or departing).

Disengaged security state 1026 corresponds to vehicle sleep power state. In response to initial input 1014 being received to modify the vehicle power state to vehicle standby power state 1008, activation command 1028 is received resulting in a modification of disengaged security state 1026 to engaged security state 1030. Engaged security state 1030 yields monitor confirmation 1016 which modifies the vehicle power state to vehicle monitor power state 1010. This enables the vehicle to modify the states of one or more of proximity sensors, cameras, and remote device wireless signal detectors, as represented by proximity sensor security state 1032, camera security state 1034, and wireless signal detection security state 1036. Any or all of these states result in data being collected and transmitted to processing circuitry (e.g., processing circuitry 118 of FIG. 1) for the enablement of data processing state 1038. Data processing state 1038 interfaces with auxiliary system controller 1040, which is configured to at least lock and unlock vehicle doors, as shown by door locks engaged security state 1042 and door locks disengaged state 1044. Each of the security states shown in vehicle security state progression 1004 may be deactivated in response to instructions transmitted via data processing state 1038 or in response to a reduction in power depicted via vehicle power state progression 1002.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:

1. A method comprising:
receiving a wireless signal from a user device;
determining that the user device is leaving a vehicle based on a signal strength of the wireless signal;
causing, using a vehicle state controller, a sensor to collect data characterizing an environment external to the vehicle in response to determining that the user device is leaving the vehicle;
detecting, using the vehicle state controller, an object different than the user device based on the collected data; and
causing the vehicle state controller to perform a responsive action using one or more components of the vehicle based on the detected object.

2. The method of claim 1, wherein:
the wireless signal corresponds to user identification data of a user associated with the user device; and
the user is external to the vehicle.

3. The method of claim 1, wherein the sensor is at least one of a camera, a lidar sensor, a radar sensor, a thermal sensor, an ultrasonic sensor, or any sensor suitable for capturing data related to one or more of distance or presence of one or more objects relative to one or more of a user of the vehicle or the vehicle, or a combination thereof, arranged to characterize the environment external to the vehicle.

4. The method of claim 1, wherein a current vehicle state has vehicle door lock status that has locked vehicle doors or unlocked vehicle doors, the method further comprising:
in response to determining the current vehicle state is inconsistent with a user state corresponding to a user location relative to the vehicle, modifying the current vehicle state to have a different vehicle door lock status.

5. The method of claim 1, wherein a current vehicle state activates the sensor for collecting and processing data related to the environment surrounding the vehicle, the method further comprising:
in response to determining the current vehicle state is inconsistent with a user state corresponding to a user location relative to the vehicle, modifying the current vehicle state.

6. The method of claim 5, wherein modifying the current vehicle state comprises preventing generation of notifications that would otherwise be generated based on data collected from the sensor.

7. The method of claim 5, wherein modifying the current vehicle state comprises deactivating a guard function that operates on data collected from the sensor.

8. The method of claim 5, wherein:
the object is a user of the vehicle; and
modifying the current vehicle state comprises continuing to monitor the user based on data collected by the sensor.

9. The method of claim 1, wherein determining the signal strength of the wireless signal received from the user device comprises:
determining a first signal parameter of the wireless signal at a first time;
determining a second signal parameter of the wireless signal at a second time;
comparing the first signal parameter to the second signal parameter; and
in response to determining the first signal parameter is different from the second signal parameter based on the comparing, modifying a vehicle state based on a difference between the first signal parameter and the second signal parameter.

10. A system comprising:
a first sensor configured to receive a wireless signal from a user device;
a system state controller configured to regulate a system state of a vehicle based at least in part on the wireless signal; and
processing circuitry of the vehicle, communicably coupled to at least one of the first sensor and the system state controller, configured to:
determine that the user device is leaving the vehicle based on a signal strength of the wireless signal by the first sensor;
causing, using the system state controller of the vehicle, a second sensor to collect data characterizing an environment external to the vehicle in response to determining that the user device is leaving the vehicle;
detect, using the system state controller, an object different from the user device based on the collected; and
cause the system state controller to perform a responsive action using one or more components of the vehicle based on the detected object.

11. The system of claim 10, wherein:
the wireless signal corresponds to user identification data of a user associated with the user device; and
the user is external to the vehicle.

12. The system of claim 10, wherein the second sensor is at least one of a camera, a lidar sensor, a radar sensor, a thermal sensor, an ultrasonic sensor, or any sensor suitable for capturing data in order to generate one or more matrices of information to display detected objects and details thereof, or a combination thereof, arranged to characterize the environment external to the vehicle.

13. The system of claim 10, wherein:
a current vehicle state has vehicle door lock status that has locked vehicle doors or unlocked vehicle doors; and
in response to the processing circuitry determining the current vehicle state is inconsistent with a user state corresponding to a user location relative to the vehicle, the processing circuitry is further configured to modify the current vehicle state.

14. The system of claim 10, wherein:
a current vehicle state activates the second sensor for collecting and processing data related to the environment surrounding the vehicle; and
in response to the processing circuitry determining the current vehicle state is inconsistent with a user state corresponding to a user location relative to the vehicle, the processing circuitry is further configured to modify the current vehicle state.

15. The system of claim 14, wherein the processing circuitry configured to modify the current vehicle state is further configured to prevent generation of notifications that would otherwise be generated based on data collected from the second sensor.

16. The system of claim 14, wherein the processing circuitry configured to modify the current vehicle state is further configured to deactivate a guard function that operates on data collected from the second sensor.

17. The system of claim 14, wherein:
the object is a user of the vehicle; and
the processing circuitry configured to modify the current vehicle state is further configured to continue monitoring the user based on data collected by the second sensor.

18. The system of claim 10, wherein the processing circuitry configured to determine the signal strength of the wireless signal received from the user device is further configured to:
determine a first signal parameter of the wireless signal at a first time;
determine a second signal parameter of the wireless signal at a second time;
compare the first signal parameter to the second signal parameter; and
in response to determining the first signal parameter is different from the second signal parameter based on the comparing, modify a vehicle state based on a difference between the first signal parameter and the second signal parameter.

19. A non-transitory computer readable medium comprising computer readable instructions which, when processed by processing circuitry, causes the processing circuitry to:
receive a wireless signal from a user device;
determine that the user device is leaving a vehicle based on a signal strength of the wireless signal;
cause, using a vehicle state controller communicatively coupled to the processing circuitry, a sensor to collect data characterizing an environment external to the vehicle in response to determining that the user device is leaving the vehicle;
detect, using the vehicle state controller, an object different than the user device based on the collected data; and
cause the vehicle state controller to perform a responsive action using one or more components of the vehicle based on the detected object.

20. The non-transitory computer readable medium of claim 19, wherein:
a current vehicle state has vehicle door lock status that has locked vehicle doors or unlocked vehicle doors; and
the non-transitory computer readable medium further comprises computer readable instructions that cause the processing circuitry to modify the current vehicle state in response to determining the current vehicle state is inconsistent with a user state corresponding to a user location relative to the vehicle.

* * * * *